United States Patent
Bizard

(10) Patent No.: US 7,283,887 B2
(45) Date of Patent: Oct. 16, 2007

(54) METHOD FOR DETERMINING A CHANGE IN DIRECTION OF ROTATION OF A MOTOR

(75) Inventor: Paul Bizard, Sully sur Loire (FR)

(73) Assignee: ArvinMeritor Light Vehicle Systems - France, Sully-sur-Loire (FR)

( * ) Notice: Subject to any disclaimer, the term of this patent is extended or adjusted under 35 U.S.C. 154(b) by 0 days.

(21) Appl. No.: 11/326,094

(22) Filed: Jan. 5, 2006

(65) Prior Publication Data

US 2006/0161273 A1    Jul. 20, 2006

(30) Foreign Application Priority Data

Jan. 14, 2005   (FR) .................................. 05 00399

(51) Int. Cl.
| | |
|---|---|
| G06F 19/00 | (2006.01) |
| G05D 13/00 | (2006.01) |
| G01P 3/00 | (2006.01) |
| H02P 1/00 | (2006.01) |
| H02P 3/00 | (2006.01) |
| H02P 27/00 | (2006.01) |

(52) U.S. Cl. ................ 700/170; 700/304; 318/280; 318/281; 318/282; 318/739; 702/145

(58) Field of Classification Search ........ 318/280–282, 318/739; 700/170, 304; 702/145
See application file for complete search history.

(56) References Cited

U.S. PATENT DOCUMENTS

| 5,134,354 A | * | 7/1992 | Yamamoto et al. ......... 318/609 |
| 5,239,242 A | * | 8/1993 | Pickering et al. ........... 318/280 |
| 5,440,218 A | * | 8/1995 | Oldenkamp ................. 318/701 |
| 5,442,267 A | * | 8/1995 | Harada ....................... 318/280 |
| 5,616,997 A | | 4/1997 | Jackson et al. |
| 5,877,955 A | * | 3/1999 | Struyk ........................ 700/69 |
| 6,222,362 B1 | | 4/2001 | Schulter et al. |

FOREIGN PATENT DOCUMENTS

| EP | 0 574 931 | 12/1993 |
| JP | 58 036181 | 3/1983 |
| JP | 61 199482 | 9/1986 |

OTHER PUBLICATIONS

French Search Report dated Sep. 6, 2005.

* cited by examiner

*Primary Examiner*—Ronald D Hartman, Jr.
(74) *Attorney, Agent, or Firm*—Carlson, Gaskey & Olds

(57) ABSTRACT

A method for determining a change in direction of rotation of a motor includes the steps of establishing steady state operating parameters of the motor, triggering a command interrupting the rotation of the motor, estimating the speed of the motor after triggering the command and determining the instant from which the speed of the motor is below zero. This instant corresponds to the change in direction of rotation of the motor. The instant from which the motor changes direction of rotation can be determined accurately.

22 Claims, 2 Drawing Sheets

METHOD FOR DETERMINING A CHANGE IN DIRECTION OF ROTATION OF A MOTOR

REFERENCE TO RELATED APPLICATION

This application claims priority to French Patent Application FR 05 00 399 filed on Jan. 14, 2005.

BACKGROUND OF THE INVENTION

This invention relates generally to a method for determining a change in direction of rotation of a motor.

In window regulators, it is important to be able to detect the presence of an obstruction when a window is closed, in particular to avoid pinching the obstruction. A system for detecting an obstruction interrupts a window drive when an obstruction is detected. It is also important to know a position of the window in an opening in order to switch off the obstruction detection system before the window enters a roof seal. Otherwise, the obstruction detection system regards the roof seal as an obstruction and interrupts the window drive before the window is fully lodged in the roof seal.

Devices to detect the position of the window in the opening use a sensor that triggers an incremental counter, allowing an angular position of the motor to be known. For example, a Hall effect sensor is used to detect a change of polarity of a magnetic ring mounted on a motor shaft. A drawback is that a single sensor does not allow for a change in the direction of rotation of the motor to be detected so that an incremental counter triggered by the sensor is inaccurate and does not allow for the position of the motor to be known with certainty. Therefore, the position of the window is not known accurately either.

To solve this problem, other devices to detect the position of the window in the opening use two sensors facing a ring with alternating polarity. The sensors are located near the motor and offset at an angle in such a way that the direction of the motor is deduced from the sensor state sequence. The incremental counter then takes into account the direction of rotation of the motor. The drawback is that these systems are more bulky and more expensive.

All these devices also have other drawbacks. In particular, the frequency of detection of the polarity of the ring on the motor by the sensor(s) depends on the rotating speed of the motor. When the rotating speed of the motor decreases, the frequency and quality of detection by the sensor(s) decreases. Knowledge of the position of the motor and of the window then becomes less accurate.

Moreover, when an obstruction is detected, the motor is immediately instructed to reverse its direction of rotation to lower the window and reduce pinching. However, the drive motor has a degree of inertia which prevents the direction of rotation of the motor from being reversed immediately. The time lapse between a motor reverse command and actual reversal of the motor is prejudicial to knowledge of the motor position.

In addition, when a command is sent to the motor to stop, it does not do so immediately due to its inertia. A slight reverse rotation movement may even occur, as transmission of the movement is not completely irreversible.

A need therefore exists to determine accurately the change of direction of rotation of a motor.

BRIEF SUMMARY OF THE INVENTION

To this end, the invention provides a method for determining a change of direction of rotation of a motor including the steps of establishing steady state operating parameters of the motor, triggering a command interrupting the rotation of the motor, estimating the speed of the motor after triggering the command and determining the instant from which the speed of the motor is below zero. This instant corresponds to the change of direction of rotation of the motor.

According to one variant, estimation of the speed of the motor is determined by a model. According to one variant, the model is the equation $$\omega(n+1)=\omega(n)-P\times(U(n)+\omega(n)+RI(0)),\text{ where}$$

$\omega(n)$ is an estimated speed of the motor at calculation step n, $\omega(n+1)$ is the estimated speed of the motor at the next calculation step, $U(n)$ is a voltage of the motor measured at the calculation step n, $RI(0)$ is a constant current of the motor measured on triggering the command, and P is a parameter function of the motor torque constant, the electro-mechanical time constant of the motor, and the calculation step.

According to one variant, the operating parameters are stored. According to one variant, the model is initiated by the stored operating parameters. According to one variant, the operating parameters include the motor supply voltage and the speed of the motor. According to one variant, the speed of the motor is measured by a single sensor. According to one variant, estimation of the speed is performed at predetermined time intervals. According to one variant, the method also includes the steps of counting pulses generated by the rotation of the motor. According to one variant, detection of the change in the direction of rotation of the motor reverses the pulse counting.

BRIEF DESCRIPTION OF THE FIGURES

Other characteristics and advantages of the invention will become apparent on reading the following detailed description of the embodiments of the invention, given as an example only, and with reference to the drawings, which show.

DETAILED DESCRIPTION OF THE INVENTION

The invention relates to a method for determining a change in direction of rotation of a motor. The method includes in particular a step of estimating a rotating speed of the motor after a command that interrupts the rotation of the motor has been triggered. This is followed by a step of determining the instant from which the speed is below zero. This instant corresponds to the change of direction of rotation of the motor. This method allows for accurate determination of the instant from which the direction of rotation of the motor changes. Knowledge of the behavior of the motor when the rotation is interrupted by a command can therefore be improved. A method of this type makes obstruction detection systems that implement the method more effective.

Figure 1:
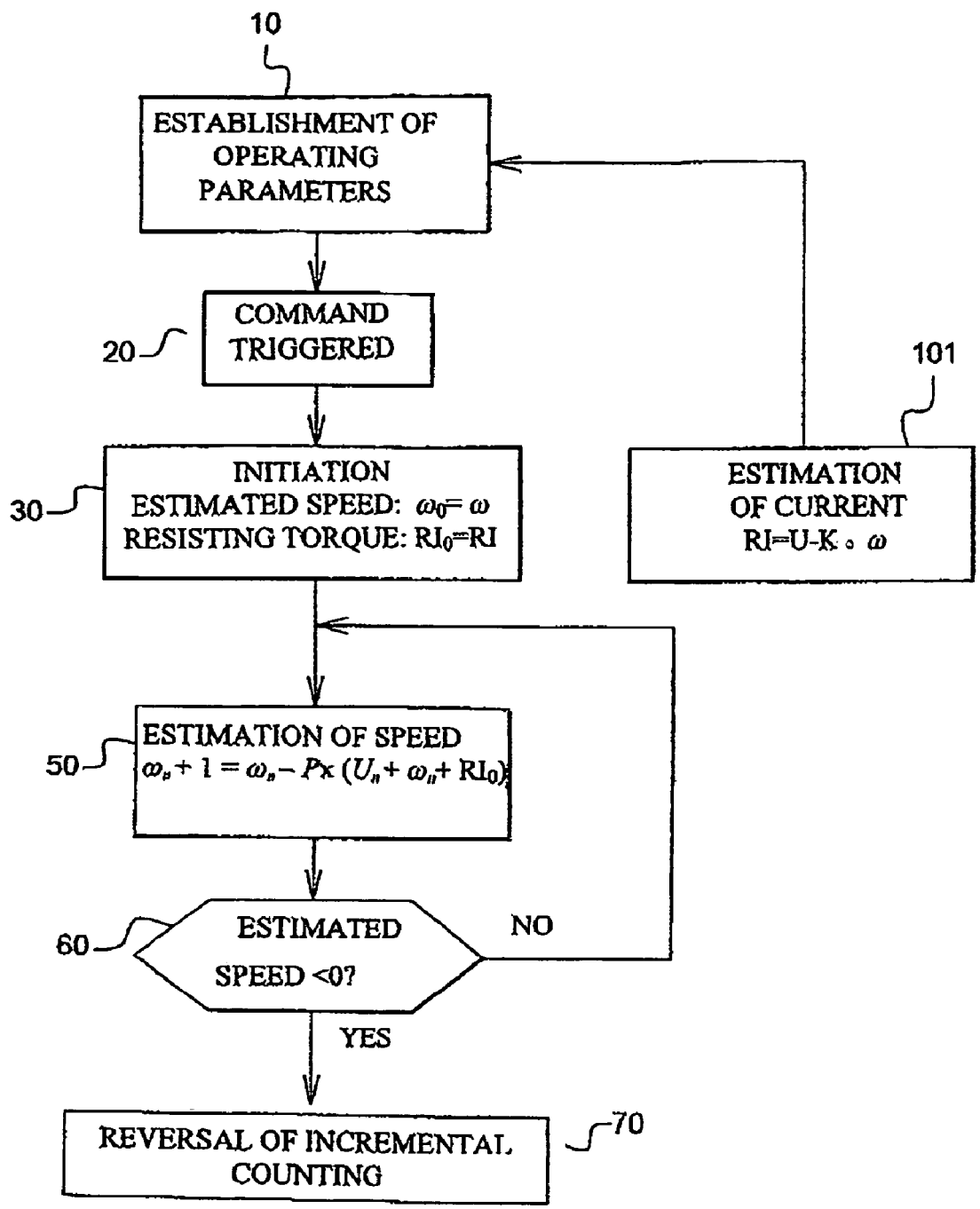
FIG. 1 shows a flow chart implementing a method according to one embodiment of the invention.

FIG. 1 shows a flow chart of the implementation of a method for determining a change of direction of rotation of a motor. This may be a vent drive mechanism motor. The vent may be a sun roof. In the following, as an example, the vent is a window, and the drive mechanism is a window regulator. The window regulator may be driven by a cable or an arm and sector.

Figure 2:
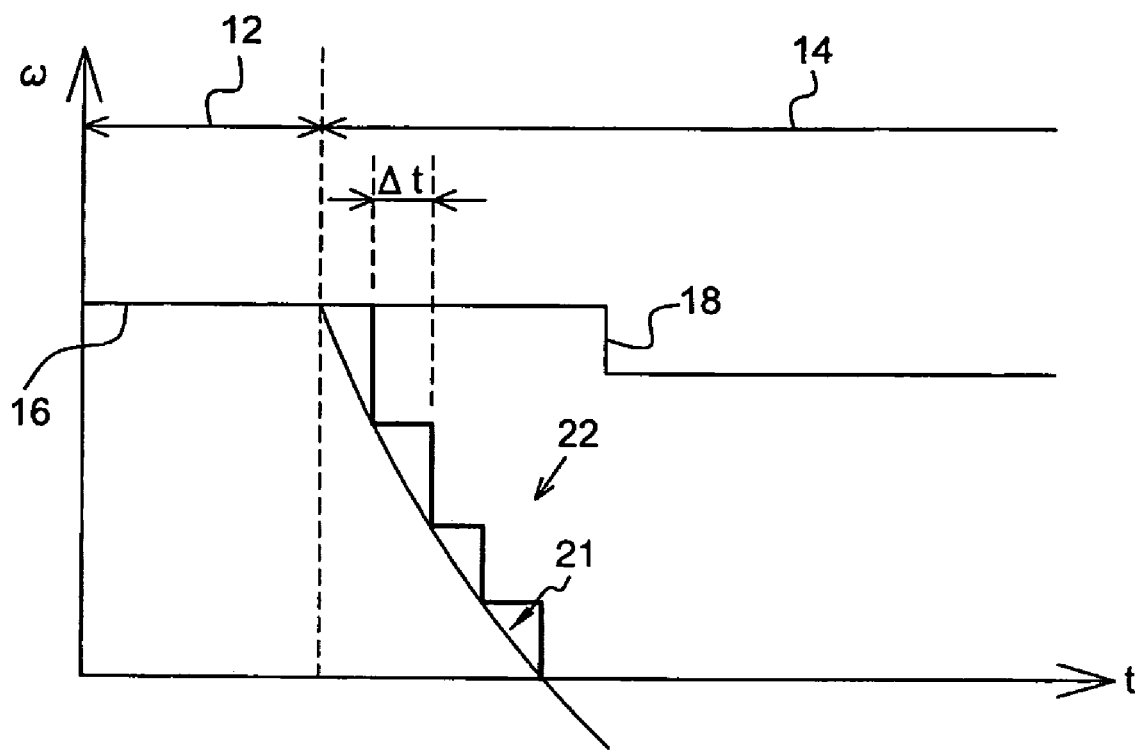
FIG. 2 shows a graph of the rotating speed when a motor is instructed to reverse.

FIG. 2 shows a graph showing the rotating speed when the motor is instructed to stop, or even to reverse. The graph shows the time t on the x-axis and the motor rotating speed ω on the y-axis. The graph includes a phase 12 of steady state operation of the motor and a phase 14 of interruption in the rotation of the motor. During the phase 12, the motor has an approximately constant rotating speed 16.

At an instant t, the command to interrupt rotation of the motor is triggered. Two curves 18 and 21 of the speed of the motor are shown. A first curve 18 corresponds to the measured speed of the motor, for example by a Hall effect sensor detecting a change of polarity sequence in a ring mounted on the shaft of a motor. The first curve 18 shows that determining the instant of change in the direction of rotation of the motor is very imprecise, since the precision of this determination is proportional to the speed, which is in fact dropping in this case. The second curve 21 corresponds to the actual speed of the motor entering the deceleration phase down to zero if the motor is instructed to stop or even to reverse and also when the speed curve passes below the x-axis when the motor is instructed to reverse direction.

FIG. 2 also shows a curve 22 showing the estimated speed after triggering of the interruption command. The curve 22 develops in stages, and each change of stage corresponds to a new estimation of the speed. The frequency of estimation of the speed can be adjusted to greater or smaller time intervals. For example, the speed can be estimated at time intervals of 3 ms. The speed estimation allows for the speed to be known regularly, in contrast to situations where the speed of the motor is measured by a sensor that detects the rotation of the ring. In these situations, the frequency of measuring the rotating speed reduces as the speed of the shaft drops, which does not allow for a value for the speed of the motor to be obtained regularly.

Returning to FIG. 1, the method includes a step of establishing 10 the steady state operating parameters of the motor. Steady state operation of the motor corresponds, for example, to raising the window towards a closed position when the window does not encounter any obstruction. This step of establishing 10 is performed during the phase 12 in FIG. 2. To put the motor into steady state operation, the user presses and holds down a window regulator control to give the instruction for the window to rise, or uses the "express-up" window regulator function which raises the window in a single motion. When the window rises, it may encounter an obstruction and pinch the obstruction against a top edge of the window. In this case, the obstruction detection system is activated at least while the window is rising.

Among the operating parameters established, the speed of the motor can be measured. This allows for the rotating speed of the motor to be known before an interruption command is triggered. The speed can be measured by means of a single sensor. This offers the advantage of making the method less expensive than a method employing a plurality of sensors. The sensor used is, for example, a Hall effect sensor. The sensor is opposite a magnetic ring mounted on the motor shaft. The sensor delivers a signal corresponding to the alternation of polarity in front of the sensor. The processing of the signal allows for the rotating speed of the motor to be known.

Among the operating parameters established, it is also possible to measure the voltage of the motor using a microprocessor converter. On the basis of knowledge of the motor voltage and rotating speed, it is possible to implement a step 101 of estimating the motor current using the formula $RI=U-K\omega$, where ω is the motor rotating speed, K is the motor torque constant, U is the motor voltage, R the motor resistance and I the motor current. The estimated current RI is proportional to the resisting torque during the phase 12 of steady state operation of the motor. The resisting torque is deemed constant during the phase 14 of interrupting the rotation of the motor.

The operating parameters are stored. This allows for values relating to these operating parameters to be available when the interruption command is triggered.

According to FIG. 1, the method then includes a step of triggering 20 a command interrupting the rotation of the motor. The interruption command is a command to stop the motor or even to reverse the direction of rotation of the motor. The command is triggered, for example, by detecting a pinching event by the obstruction detection system. The motor is then instructed to reverse. The command can also be triggered by the user wishing to stop the movement of the window. The command can also be triggered when the window reaches the upper seal. In these two latter cases, the motor is instructed to stop only.

Next, the method can include a step of initiation 30 to initiate the algorithm implemented during the next step of estimating 50 the speed. Initiation is triggered as soon as the interruption command is triggered. Initiation is carried out using the stored operating parameters. The step of initiation 30 includes initiation of the estimated speed ω(0) of the motor using the last speed of the motor measured during the step 101. The step of initiating 30 also includes the initiation of the estimated current RI(0) using the last value for current estimated in the step of establishing 10.

FIG. 1 shows the step of estimating 50 and a step of determining 60. During the step of estimating 50, the speed of the motor after triggering of the interruption command is estimated. After triggering the command, the motor enters a deceleration phase during which the speed of the motor decreases as shown in FIG. 2 until it reaches zero. The speed of the motor is then estimated during the deceleration of the motor. The step of estimating 50 now allows for the speed value to be obtained by evaluation and no longer by measurement. The step of estimating 50 during deceleration removes the requirement for the use of motor speed measurement equipment resulting in inconsistent and low quality measurements during the deceleration phase of the motor.

Estimation of speed during the step of estimating 50 may be carried out at pre-determined time intervals Δt, for example of 3 ms. The time intervals can be shorter, which improves the accuracy of the method. By this means, speed values can be obtained regularly. The speed is estimated, for example, using a recurrent model that is expressed in the equation:

$$\omega(n+1)=\omega(n)-P\times(U(n)+\omega(n)+RI(0)), \text{ where}$$

(n) is a estimated speed of the motor at calculation step n, (n+1) is an estimated speed of the motor at the following calculation step, (n) is a motor voltage measured at the calculation step n, RI(0) is a constant current of the motor measured at the calculation step corresponding to the triggering the command, and P is a parameter function of the motor torque constant, the motor electro-mechanical time constant, $\tau_{em}$ and also a function of the calculation step. In this model, $P=(1-\exp(-\Delta t/\tau_{em}))/K$.

Estimation of the speed at each calculation step $\omega(n+1)$ is determined as a function of the speed estimated at the previous calculation step $\omega(n)$. Also, the values $\omega(0)$ and RI(0) allow the speed estimation model to be initiated. The calculation steps correspond to the estimation of the speed during the successive pre-determined time intervals $\Delta t$.

During the following step of determining 60, the method determines the instant from which the speed estimated in the step of estimating 50 is below zero, with this instant corresponding to the change in direction of rotation of the motor. The speed becoming negative reflects the reversal of the direction of rotation. The change of sign for the speed is determined by a microprocessor implementing the method.

Knowledge of the instant from which the motor changes its direction of rotation improves determination of the position of the motor. For example, the position of the motor can be known by incremental steps on a counter in one direction or the other direction, depending on the direction of rotation of the motor. The incremental steps can be established by counting pulses generated by the rotation of the motor. The method allows for knowledge of the instant from which the direction of the incremental steps must be reversed. Determination of the position of the motor is thus made more accurate.

As long as the estimated speed is not below zero, the step of estimating 50 and the step of determining 60 are reiterated. This is shown on FIG. 1. During this time, pulse counting increases in one direction. However, when it is established in the step of determining 60 that the estimated speed is, below zero (reflecting a reversal of the direction of rotation of the motor), the method then includes a step of reversing the pulse counting. Thus, depending on whether the window is moving up or down, the pulses are counted in one direction or the other. Using the method, counting is accurately reversed when the motor actually changes direction. Thus, whether the direction of the motor is interrupted for a reason associated with detecting a pinching event, detecting the window reaching its end of travel, or simply a user-controlled stop, the angular position of the motor is known accurately. This then allows for the position of the window in the opening to be known.

The method also allows for a slight rebound movement to be taken into account in the determination of the change of direction of rotation of the motor. This slight rebound movement is reflected in a reverse movement of the motor and is due to the fact that the transmission of the motor drive movement is not irreversible. This slight rebound is then comparable from the point of view of the method to a command interrupting the rotation of the motor to reverse the rotation of the motor. Incremental pulse counting is reversed if the measured speed of the motor becomes negative.

Of course, this invention is not limited to the embodiments described as an example. Thus, the operating parameters established are given as an example.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A method for determining a change in direction of rotation of a motor, the method comprising the steps of:
    establishing steady state operating parameters of the motor;
    triggering a command interrupting the rotation of the motor;
    estimating a speed of the motor by using the steady state operating parameters after the step of triggering the command; and
    determining an instant the speed of the motor is below zero, wherein the instant corresponds to the change in the direction of the rotation of the motor.

2. The method according to claim 1, wherein the step of estimating the speed of the motor is determined by a model.

3. The method according to claim 2, wherein the model is determined by an equation $\omega(n+1)=w(n)-P\times(U(n)+w(n)+RI(0))$, wherein
    $\omega(n)$ is an estimated speed of the motor at a calculation step n,
    $\omega(n+1)$ is an estimated speed of the motor at a next calculation step (n+1),
    $U(n)$ is a motor voltage measured at the calculation step n,
    RI(0) is a constant current of the motor measured at the step of triggering the command, and
    P is a parameter function of a motor torque constant, an electro-mechanical time constant of the motor, and the calculation step n.

4. The method according to claim 2, further including the step of storing the steady state operating parameters.

5. The method according to claim 4, further including the step of initiating the model by the steady state operating parameters that are stored.

6. The method according to claim 1, wherein the steady state operating parameters include a supply voltage of the motor and the speed of the motor.

7. The method according to claim 6, wherein the motor includes a single sensor, and wherein the speed of the motor is measured using the single sensor.

8. The method according to claim 1, wherein the step of estimating the speed of the motor includes estimating the speed of the motor at pre-determined time intervals.

9. The method according to claim 1, further including the step of counting pulses generated by the rotation of the motor.

10. The method according to claim 9, wherein determining the change of the direction of the rotation of the motor reverses the step of counting the pulses.

11. The method according to claim 1, wherein the step of establishing the steady state operating parameters of the motor includes raising a closure when no obstruction is present in a path of the closure.

12. The method according to claim 1, wherein the motor rotates in a first direction, and the rotation of the motor is in an opposite second direction when the speed of the motor is below zero.

13. A method for determining a change in direction of rotation of a motor, the method comprising the steps of:
    establishing steady state operating parameters of the motor;
    triggering a command interrupting the rotation of the motor;

estimating a speed of the motor by using the steady state operating parameters after the step of triggering the command, wherein the speed of the motor is estimated by a model; and determining an instant the speed of the motor is below zero, wherein the instant corresponds to the change in the direction of the rotation of the motor.

14. The method according to claim 13, wherein the model is determined by an equation $\omega(n+1)=\omega(n)-P\times(U(n)+\omega(n)+RI(0))$, wherein $\omega(n)$ is an estimated speed of the motor at a calculation step n, $\omega(n+1)$ is an estimated speed of the motor at a next calculation step (n+1), U(n) is a motor voltage measured at the calculation step n, RI(0) is a constant current of the motor measured at the step of triggering the command, and P is a parameter function of a motor torque constant, an electro-mechanical time constant of the motor, and the calculation step n.

15. The method according to claim 13, further including the step of storing the steady state operating parameters.

16. The method according to claim 15, wherein the model is initiated by the steady state operating parameters that are stored.

17. The method according to claim 13, wherein the steady state operating parameters include a supply voltage of the motor and the speed of the motor.

18. A method for determining a change in direction of rotation of a motor, the method comprising the steps of:

establishing steady state operating parameters of the motor, wherein the steady state operating parameters include a supply voltage of the motor and a speed of the motor;

triggering a command interrupting the rotation of the motor;

estimating the speed of the motor by using the steady state operating parameters after the step of triggering the command, and measuring the speed of the motor using a single sensor; and determining an instant the speed of the motor is below zero, wherein the instant corresponds to the change in the direction of the rotation of the motor.

19. The method according to claim 18, wherein the step of estimating the speed of the motor is determined by a model.

20. The method according to claim 19, wherein the model is determined by an equation $\omega(n+1)=\omega(n)-P\times(U(n)+\omega(n)+RI(0))$, wherein $\omega(n)$ is an estimated speed of the motor at a calculation step n, $\omega(n+1)$ is an estimated speed of the motor at a next calculation step (n+1), U(n) is a motor voltage measured at the calculation step n, RI(0) is a constant current of the motor measured at the step of triggering the command, and P is a parameter function of a motor torque constant, an electro-mechanical time constant of the motor, and the calculation step n.

21. The method according to claim 18, further including the step of storing the steady state operating parameters.

22. The method according to claim 18, wherein the step of estimating the speed of the motor includes estimating the speed at pre-determined time intervals.

* * * * *